United States Patent [19]
Fujii et al.

[11] Patent Number: 5,993,076
[45] Date of Patent: Nov. 30, 1999

[54] CAMERA HAVING PHOTOGRAPHING STATE FOR TAKING PHOTOGRAPHS AND COMPACT PORTABLE STATE

[75] Inventors: Takashi Fujii, Sayama; Kazunori Mizokami; Chiaki Okuhara, both of Hachioji, all of Japan

[73] Assignee: Olympus Optical Co. Ltd., Tokyo, Japan

[21] Appl. No.: 08/965,007

[22] Filed: Nov. 5, 1997

[30] Foreign Application Priority Data

Nov. 6, 1996 [JP] Japan ................................. 8-294147

[51] Int. Cl.⁶ ........................................... G03B 17/04
[52] U.S. Cl. ........................ 396/348; 396/390; 396/538
[58] Field of Search ................................. 396/348, 349, 396/350, 387, 389, 390, 392, 395, 397, 406, 409, 410, 535, 538

[56] References Cited

U.S. PATENT DOCUMENTS 5,479,226 12/1995 Kazami et al. ...................... 396/390
5,510,865 4/1996 Koenig et al. ...................... 396/390
5,608,479 3/1997 Park ................................. 396/390
5,652,920 7/1997 Kaihara et al. ................. 396/177 X

FOREIGN PATENT DOCUMENTS 6-82892 3/1994 Japan .
6-258700 9/1994 Japan .

Primary Examiner—Safet Metjahic
Assistant Examiner—J. K. Han
Attorney, Agent, or Firm—Pillsbury Madison & Sutro LLP

[57] ABSTRACT

When a camera is set in a portable state responsive to a photographing state detection device and a portable state detection device, film is rewound from a take-up spool chamber into a film cartridge and the take-up spool chamber is compressed in the direction of film feed to reduce the size of the camera body in the film feed direction. When the camera is set in a photographing state, the camera body is extended and the film is taken up from the film cartridge into the take-up spool chamber.

17 Claims, 16 Drawing Sheets

CAMERA HAVING PHOTOGRAPHING STATE FOR TAKING PHOTOGRAPHS AND COMPACT PORTABLE STATE

BACKGROUND OF THE INVENTION

1. Field of the Invention

The present invention relates to a camera and, more particularly, to a camera having at least two modes, i.e., a portable mode and a photographing mode.

2. Related Art Statement

Conventionally, a camera is desirably reduced in size to improve the portability of the camera, and various compact cameras are developed and practically used. On the other hand, a recent compact camera has an auto-focus function, an electric flash unit, and the like to obtain a simple photographing method and high performance. In addition, in such a camera, a film winding operation and a film rewinding operation are made automatic, an extending operation of a lens barrel or the like is performed by a motor or the like, a battery cell serving as a driving power supply for these operations are built in the camera, so that the camera body is made as small as possible. A large number of cameras similar to the above camera are disclosed.

Furthermore, in recent years, a large number of cameras using the following film are disclosed. That is, assume that a film as a whole is accommodated in a cartridge, that the film is fed out of the cartridge to be used, and that the film is rewound without exposing all the frames of the film and loaded on the cartridge again. In this case, the film can be used such that the film is fed out to an unexposed frame.

However, as described above, portability is improved as the camera body is reduced in size. In a photographing state, when a finger is put on an optical system or the like for an auto-focusing operation, a distance is erroneously measured, and an out-of-focus picture may be obtained. When the camera body is reduced in size, the distance between an electric flash emitting unit and a photographing lens decreases, a so-called red-eye phenomenon in which red eyes are picked up as an image in an electric flash photographing state may occur. In a photographing state, a reduction in size of the camera may adversely affect photographed pictures.

OBJECTS AND SUMMARY OF THE INVENTION

It is the first object of the present invention to provide a camera whose portability is improved without adversely affecting functions and operability in a photographing state.

It is the second object of the present invention to provide a camera whose size is suitable for photographing in a photographing state and is small in a portable state.

It is the third object of the present invention to provide a camera characterized in that a take-up spool chamber is reduced in size to reduce the camera as a whole in a portable state, and the reduced take-up spool chamber is accommodated to a proper state in a photographing state.

In brief, in the camera according to the present invention, when a portable state is set on the basis of results obtained from a photographing state detection means and a portable state detection means, a film is rewound from a take-up spool chamber to be accommodated in a film cartridge, the take-up spool chamber is compressed in a film feeding direction to reduce the camera body in size in the film feeding direction, and, when a photographing state is set, the camera body is extended to take up the film from the film cartridge into the take-up spool chamber.

This objects and advantages of the present invention will become further apparent from the following detailed explanation.

DETAILED DESCRIPTION OF THE PREFERRED EMBODIMENTS

Embodiments of the present invention will be described below with reference to the accompanying drawings.

Figure 1:
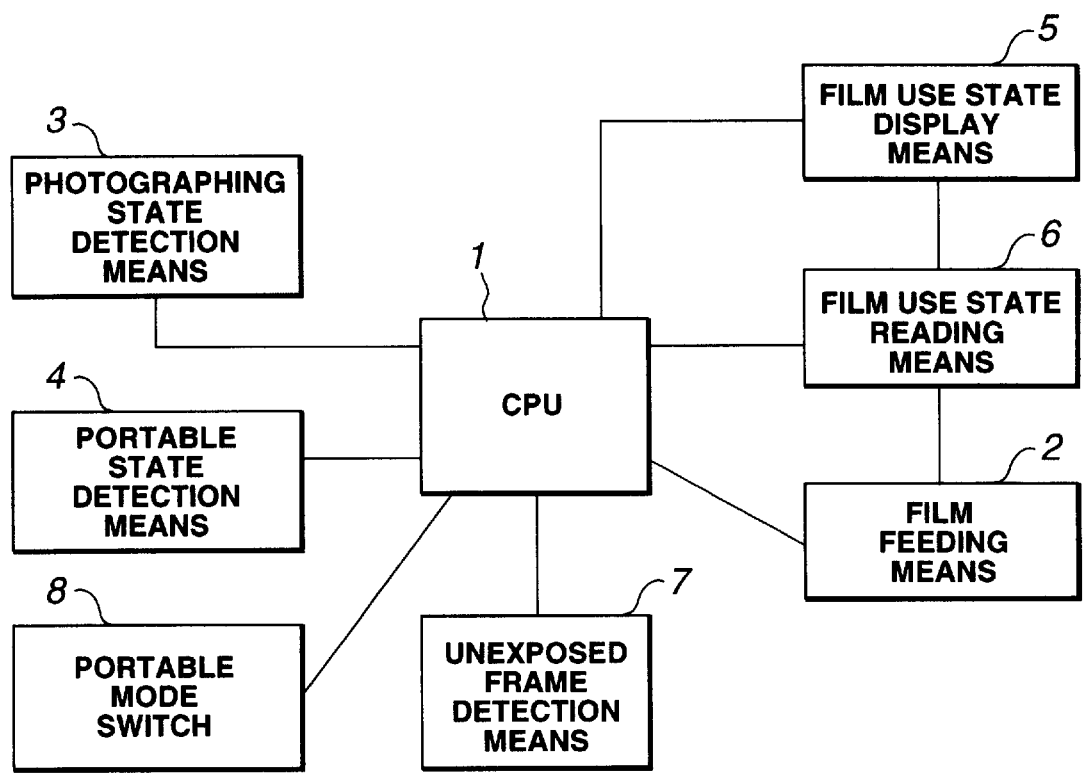
FIG. 1 is a schematic block diagram showing the arrangement of a portable camera according to the first embodiment of the present invention.

FIG. 1 is a schematic block diagram showing the arrangement of a portable camera according to an embodiment of the present invention.

As shown in FIG. 1, a camera according to this embodiment includes:

a film feeding means 2 for winding/rewinding a film;

a photographing state detection means 3 for detecting that a camera body is set in a photographing state in which photographing can be performed;

a portable state detection means 4 for detecting that the camera body is set in a portable state in which the camera body is reduced in size;

a portable mode switch 8 in which a user inputs a signal to the camera to set the camera body in a portable state;

a film use state display means 5 for displaying whether all the frames of the film loaded on the camera have been unexposed, some frames of the film have been exposed, or all the frames have been exposed;

a film use state reading means 6 for reading the use state of the film;

an unexposed frame detection means 7 for reading magnetic information recorded on the film to detect an unexposed frame; and a CPU (Central Processing Unit) 1 for controlling the above means and controlling all the circuits in the camera.

Figure 2A:
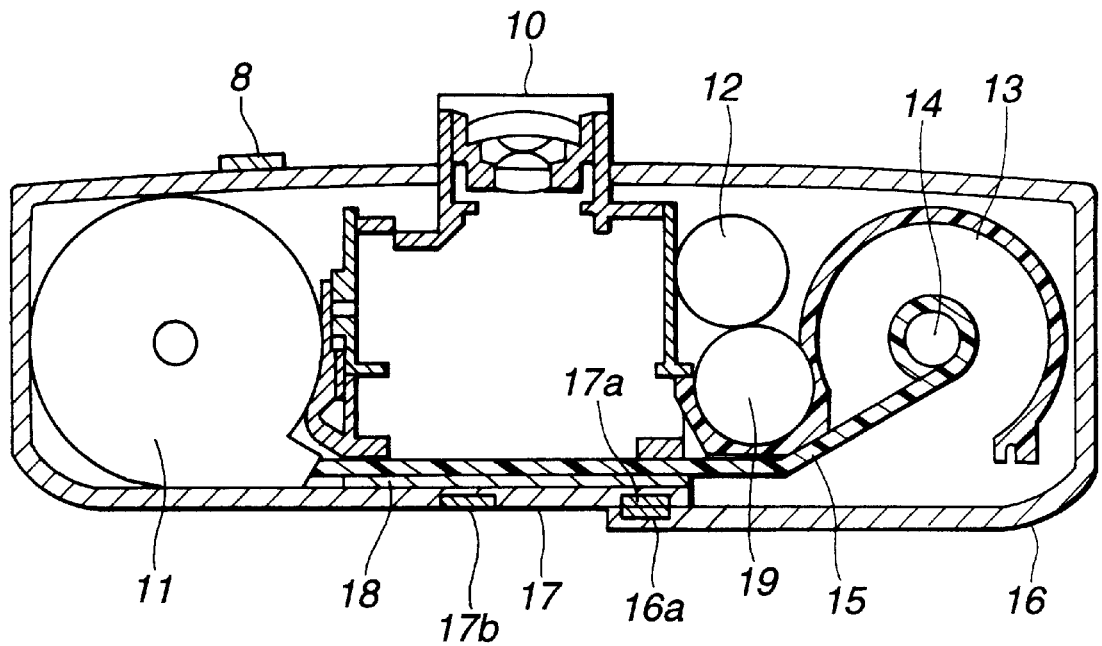
FIG. 2A is a sectional view showing the internal structure of the portable camera according to the first embodiment in a photographing mode state when viewed from the upper side.
Figure 3A:
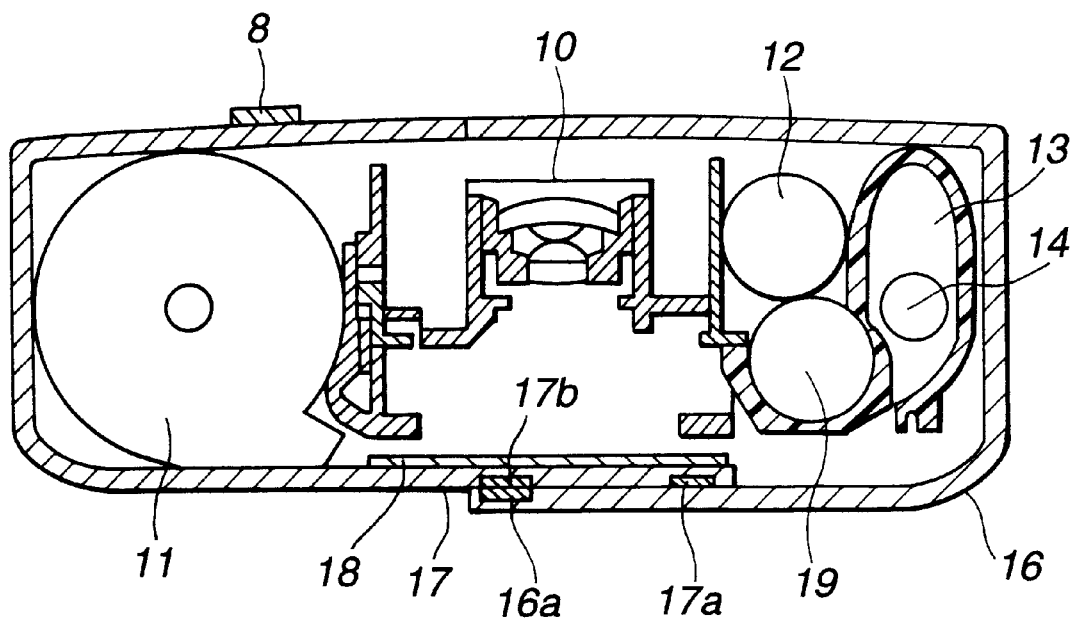
FIG. 3A is a sectional view showing the internal structure of the portable camera according to the first embodiment in a portable mode state when viewed from the upper side.

FIGS. 2A and 3A are sectional views showing the internal structure of the portable camera according to this embodiment when viewed from the upper side. FIG. 2A shows a photographing mode state, and FIG. 3A shows a portable mode state.

As shown in FIGS. 2A and 3A, the body of the portable camera according to this embodiment comprises a first camera body 16 and a second camera body 17 which will be described below. The first camera body 16 incorporates a film take-up spool chamber 13, an electric flash main capacitor 12, a battery cell 19, and the like. The second camera body 17 incorporates a photographing lens unit set 10, a press plate 18, a loading chamber for a film cartridge 11, and the like.

The first camera body 16 can be extended/reduced with respect to the second camera body 17 in a film feeding direction.

The first camera body 16 has a contact point 16a formed thereon, and the second camera body 17 has contact points 17a and 17b formed thereon. In a photographing state, the contact point 16a is in contact with the contact point 17a to constitute a photographing state detection means 3 for detecting a photographing state. In a portable state, the contact point 16a is in contact with the contact point 17b to constitute a portable state detection means 4.

Figure 2B:
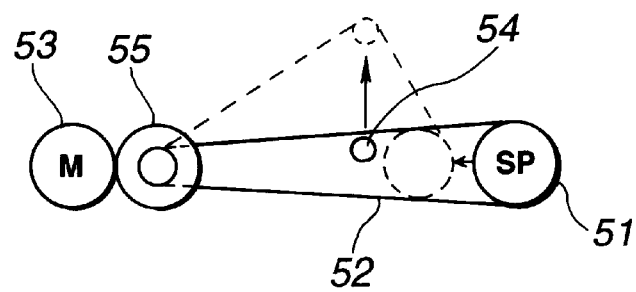
FIG. 2B is a view for briefly explaining the internal structure of the portable camera according to the first embodiment in a photographing mode state.
Figure 3B:
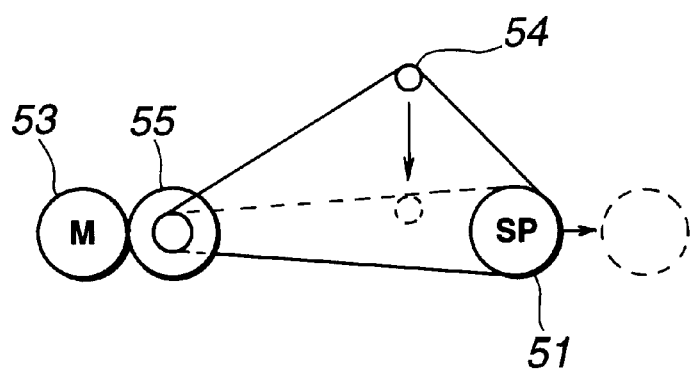
FIG. 3B is a view for briefly explaining the internal structure of the portable camera according to the first embodiment in a portable mode state.

As shown in FIGS. 2B and 3B, a spool 51 is driven by a belt 52 through a gear 55 by means of a motor 53. Referring to FIG. 2B, a solid line indicates a photographing state, and a dotted line indicates a portable state. Since the spool 51 moves to the film cartridge loading chamber in the portable state, the belt 52 becomes loose. In order to make the belt 52 tight, a pin 54 moves in a direction indicated by an arrow in FIG. 2B.

The film cartridge 11 is accommodated in the film cartridge loading chamber formed in the second camera body 17. After the accommodation, a film 15 drawn from the film cartridge 11 is taken up by a take-up spool 14 in the take-up spool chamber 13.

In this embodiment, the wall portions constituting the take-up spool chamber 13 consist of an elastic material or a flexible material. The first camera body 16 is arranged such that the first camera body 16 can be slid along a guide or the like (not shown) with respect to the second camera body 17 in the film feeding direction.

More specifically, in a photographing operation or the like, i.e., a photographing mode using the camera, the camera is set such that the first camera body 16 is extended in the film feeding direction (see FIG. 2A). On the other hand, upon completion of the photographing operation, in a portable state or the like, i.e., a portable mode, the film 15 wound on the take-up spool 14 is rewound on the film cartridge 11, and a lock state set by a lens barrel is released. Thereafter, the first camera body 16 is reduced in the direction opposing the above direction to reduce the camera body in size (see FIG. 3A).

In the reduction state of the camera body as shown in FIG. 3A, since the take-up spool chamber 13 consists of an elastic material or a flexible material as described above, the take-up spool chamber 13 is deformed to be compressed in the film feeding direction as shown in FIG. 3. More specifically, the camera body as a whole is reduced in proportion to an amount of deformation of the take-up spool chamber 13.

The photographing state detection means 3 and the portable state detection means 4 are constituted by not only different switches, i.e., a switch turned on when the camera is set in a photographing state and a switch turned on when the camera is set in a portable state, but also one switch for example. In the later case, the photographing mode or the portable mode may be determined by checking the ON/OFF state of the switch. More specifically, the photographing state detection means 3 and the portable state detection means 4 may be constituted by the same detection unit.

Figure 4A:
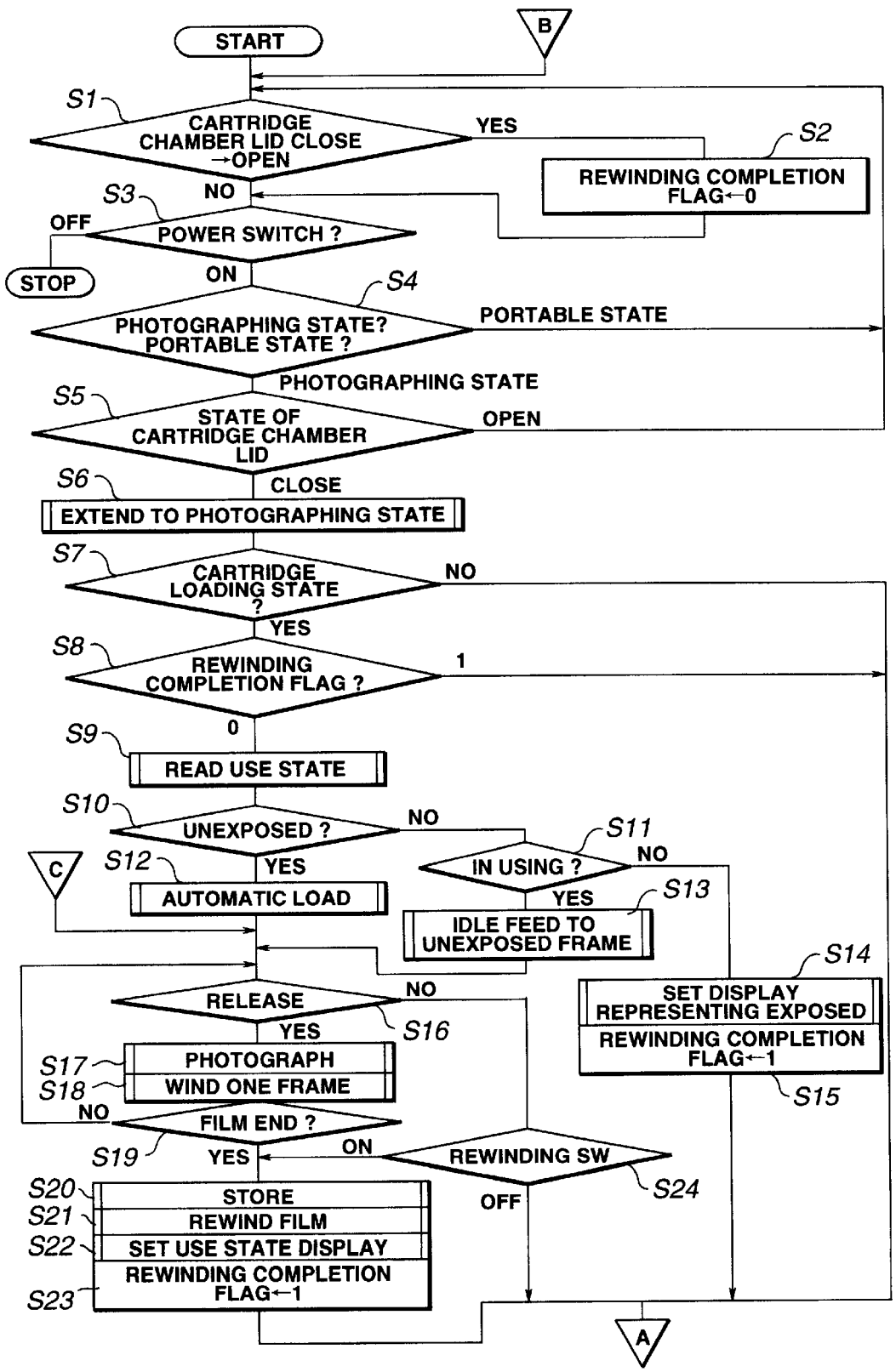
FIG. 4A is a flow chart showing main operations of the portable camera according to the first embodiment.
Figure 4B:
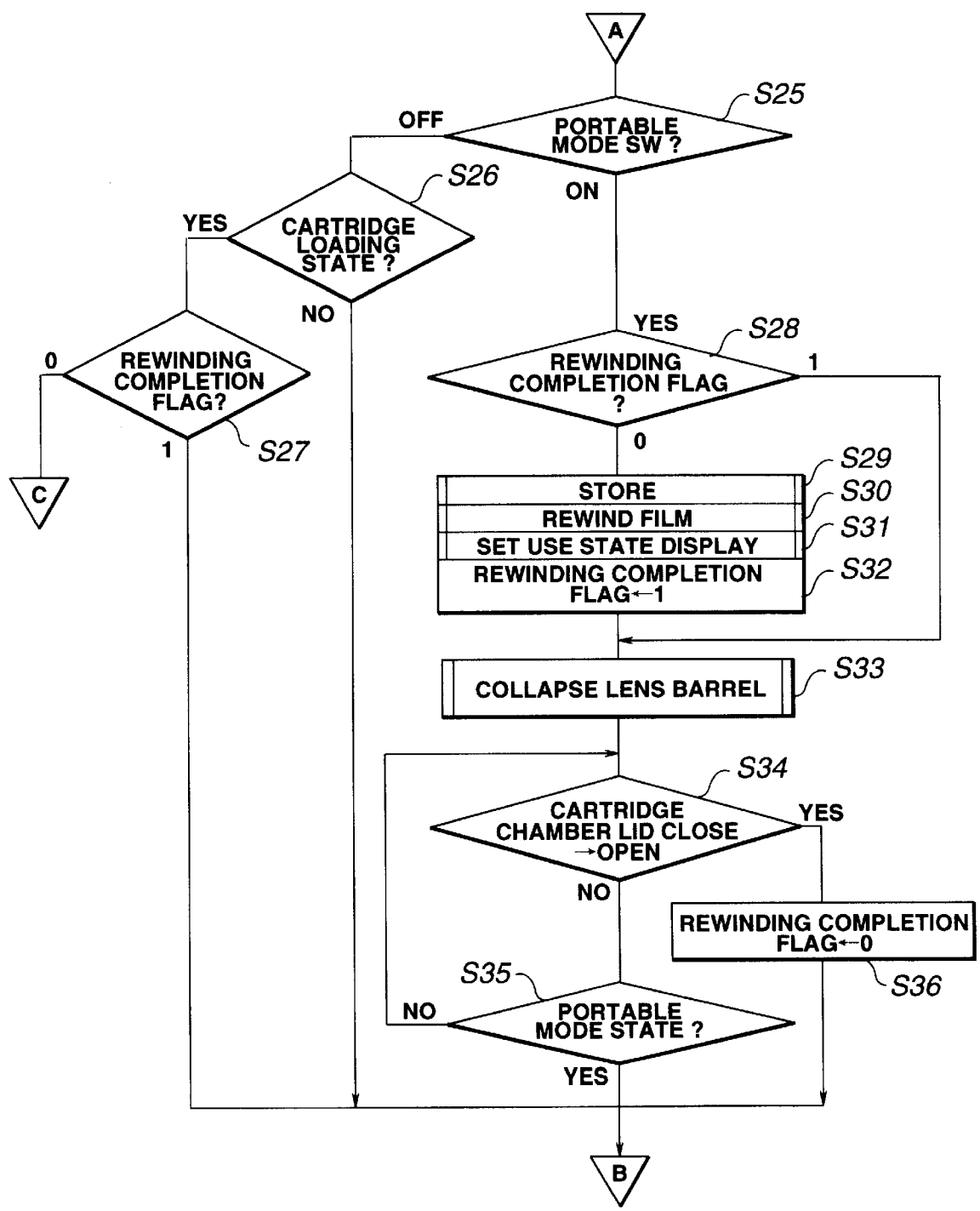
FIG. 4B is a flow chart showing main operations of the portable camera according to the first embodiment.

FIGS. 4A and 4B are flow charts showing main operations of the portable camera of the first embodiment. The operations of the camera will be described below with reference to the flow charts.

As shown in FIG. 4A, the CPU 1 checks whether the lid of a loading chamber for the film cartridge 11 (not shown) changes from a closed state to an open state (step S1). If the lid changes, a rewinding completion flag is cleared in step S2, and the flow shifts to step S3. On the other hand, if the lid does not change, the flow shifts to step S3.

The CPU 1 checks in step S3 whether a power switch of the camera is ON or OFF (step S3). If the switch is OFF, a "STOP" mode is set. If the switch is ON, the flow shifts to step S4. If the CPU 1 determines the "STOP" mode is set, a program is designed such that the above operations are executed from START again when the switch such as the lid of the film cartridge chamber (not shown) changes.

In step S4, the CPU 1 detects whether the camera is set in a photographing mode state or a portable mode state. If the camera is set in the portable mode state, the flow returns to step S1; otherwise, the flow shifts to step S5.

In step S5, the state of the lid of the loading chamber for the film cartridge 11 is checked. If the lid is open, the flow returns to step S1; otherwise, the flow shifts to step S6.

In step S6, the lens barrel is extended to a photographing position as shown in FIG. 2A. When the lens barrel is extended to the photographing position, the first camera body 16 is locked to prevent the camera from being reduced to a size in the portable state.

In step S6, if the camera has been set in the photographing state, the CPU 1 does not operate in step S6, and the flow shifts to next step S7.

The CPU 1 detects in step S7 whether the film cartridge 11 is loaded on the camera (step S7). If the film cartridge 11 is not loaded on the camera, the flow shifts to step S25 shown in FIG. 4B; otherwise, the flow shifts to step S8.

The CPU 1 checks in step S8 whether the rewinding flag is set or cleared. If the rewinding flag is set, the flow shifts to step S25 shown in FIG. 4B. If the rewinding flag is cleared, the flow shifts to step S9 to read the use state of the film in the film cartridge 11 (step S9).

Conventional various means for reading the use state of the film 15 in the film cartridge 11 are disclosed. Any one of the various means may be employed.

In steps S10 and S11, the CPU 1 checks on the basis of the use state read in step S9 whether the film 15 in the film cartridge 11 has been unexposed, is in use, or has been completely exposed throughout all the frames. More specifically, if the film 15 has been unexposed in step S10, the CPU 1 performs automatic loading to set the first frame at a photographing position (step S12).

If the film 15 is in use in step S11, the CPU 1 idly feeds the film to an unexposed frame to set the unexposed frame to a photographing position (step S13), and the flow shifts to step S16.

If all the frames have been exposed, the CPU 1 sets a display representing an exposed state (step S14) and sets a rewinding flag (step S15), and the flow shifts to step S25.

As a control method in step S13, various methods for reading magnetic data of photographing information recorded on each frame to determine a frame whose magnetic data cannot be detected as an unexposed frame are disclosed. Any one of these methods may be used.

The CPU 1 checks in step S16 whether a release switch (not shown) is pressed. If the release is pressed, the CPU 1 performs a photographing sub-routine (step S17) and then performs a sub-routine for winding one frame (step S18).

The moment the film is wound by one frame, photographing data such as date is magnetically recorded on the film. However, a large number of methods with respect to magnetic recording during one-frame winding are disclosed. Any one of the methods may be used.

Thereafter, the CPU 1 checks in step S19 whether the film is end (whether the last frame is photographed). If the film is not end, the flow returns to step S16; otherwise, data representing that all the frames have been exposed is stored in a non-volatile memory such as an EEPROM (not shown) (step S20). A film rewinding operation is performed in step S21.

If the release switch is not pressed in step S16, the flow shifts to step S24 to check whether a rewind switch (not shown) is pressed. If the rewind switch is pressed (ON), data representing that some frames of the film have been exposed is stored in a non-volatile memory such as an EEPROM (step S20), a film rewinding operation is performed in step S21. The CPU 1 sets a use state display of the film according to the use state of the film (step S22). A rewinding flag representing the rewinding operation is completed is set (step S23).

Thereafter, as shown in FIG. 4B, the CPU 1 checks whether the portable mode switch is ON or OFF (step S25). If the portable mode switch is OFF, the CPU 1 checks whether the film cartridge 11 is loaded (step S26). If the film cartridge 11 is not loaded in step S26, the flow returns to step S1. If the film cartridge 11 is loaded, the CPU 1 checks whether the rewinding flag is set to "1" or "0" (step S27). If the rewinding flag is set to "1", the flow returns to step S1 in FIG. 4A. If the rewinding flag is set to "0", the flow returns to step S16 in FIG. 4A.

If the portable mode switch is ON in step S25, the CPU 1 checks whether the rewinding operation is completed (step S28).

Here, when the film 15 is loaded, the flow shift to step S29 to store the use state of the film or the like in a non-volatile memory such as an EEPROM, and the film 15 is rewound into the film cartridge 11 (step S30). Thereafter, the CPU 1 sets a film use state display depending on the use state of the film (step S31), the rewinding completion flag is set to "1" (step S32), and the flow shifts to step S33.

On the other hand, if the film 15 is wound in the film cartridge 11 in step S28, i.e., if the rewinding flag is set to "1", the flow shifts to step S33.

In step S33, the lens barrel is collapse into the body as shown in FIG. 3A, and the lock state of the first camera body is released accordingly. As a result, a user can compress the first camera body to reduce the camera in size.

The CPU 1 checks whether the lid of the loading chamber of the film cartridge 11 changes from a closed state to an open state (step S34). If the lid changes, the flow shifts to step S36 to clear the rewinding flag. If the lid does not change, the flow shifts to step S35 to check whether a user compresses the camera body to reduce the camera in size to the size in the portable state. If NO in step S35, the flow shifts to step S34; otherwise, the flow returns to step S1 in FIG. 4A.

In this manner, the portable camera according to this embodiment has the following characteristic features. That is, when the portable mode is selected, the film 15 is rewound into the film cartridge 11, and an empty space, i.e., the take-up spool chamber 13 is compressed to be reduced in size, thereby reducing the camera in size as a whole. In addition, when the photographing mode is selected, the take-up spool chamber 13 which is compressed is restored to a proper state, and the film is idly fed to an unexposed frame on the basis of the detection results of the film use state reading means 6 and the unexposed frame detection means 7 to make it possible to perform a photographing operation.

As described above, a camera which has a size at which a photographing operation is easily performed in a photographing state and has a small size to obtain good portability can be realized.

As described above, according to the first embodiment, a camera whose portability is improved without degrading functions and operability in the photographing state can be provided.

The second embodiment of the present invention will be described below.

Figure 5:
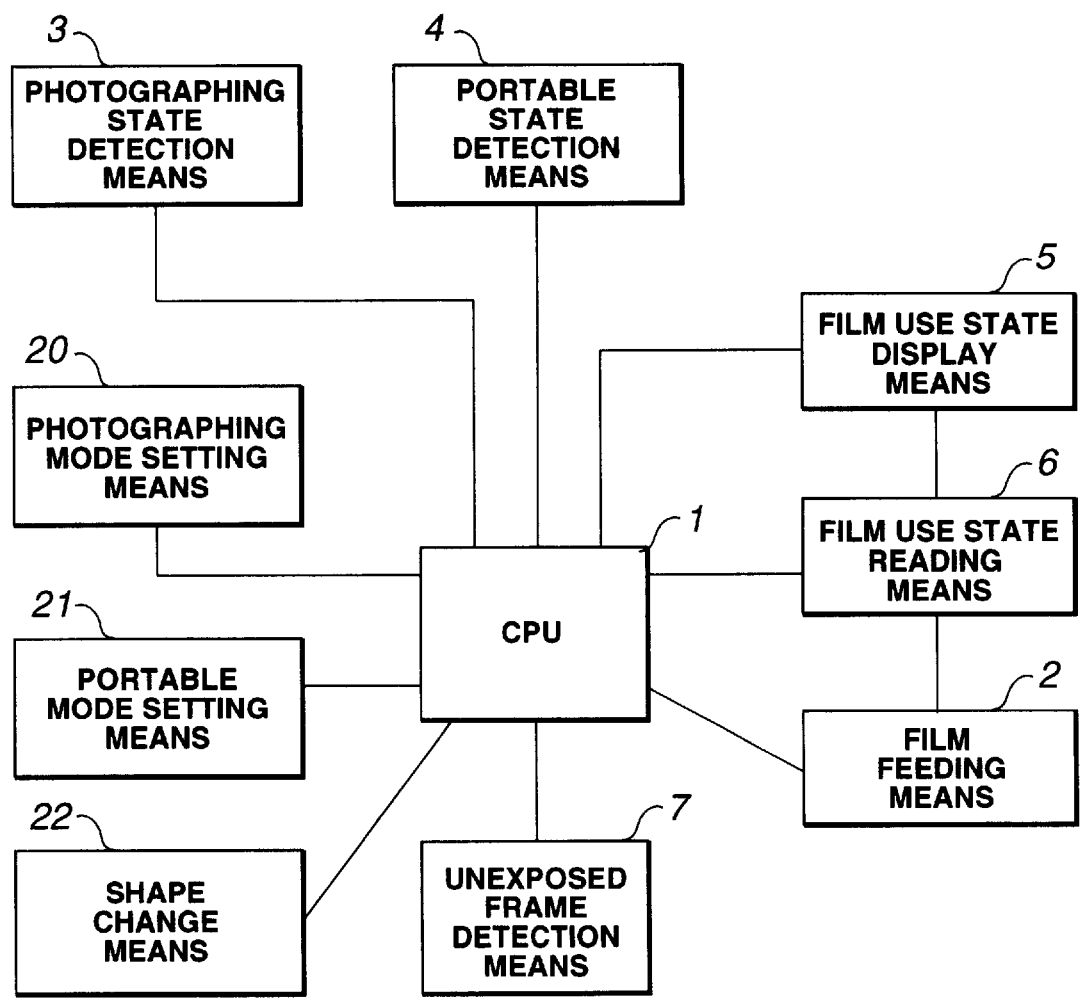
FIG. 5 is a schematic block diagram showing the arrangement of a portable camera according to the second embodiment of the present invention.

FIG. 5 is a schematic block diagram showing the arrangement of a portable camera according to the second embodiment of the present invention.

As shown in FIG. 5, the camera according to this embodiment includes:

a film feeding means 2 for winding/rewinding a film;

a photographing mode setting means 20 for setting a photographing mode in a photographing state in which photographing can be performed;

a portable mode setting means 21 for setting a portable mode in which a camera body is reduced in size to a portable state;

a film use state display means 5 for displaying whether all the frames of the film loaded on the camera have been unexposed, some frames of the film have been exposed, or all the frames have been exposed;

a film use state reading means 6 for reading the use state of the film;

a shape change means 22 for changing the camera body to a photographing state and a portable state;

a photographing state means 3 for detecting that the camera is set in the photographing state;

a portable state means 4 for detecting that the camera is set in the portable state;

an unexposed frame detection means 7 for reading magnetic information recorded on the film to detect an unexposed frame; and a CPU (Central Processing Unit) 1 for controlling the above means and controlling all the circuits in the camera.

Figure 6:
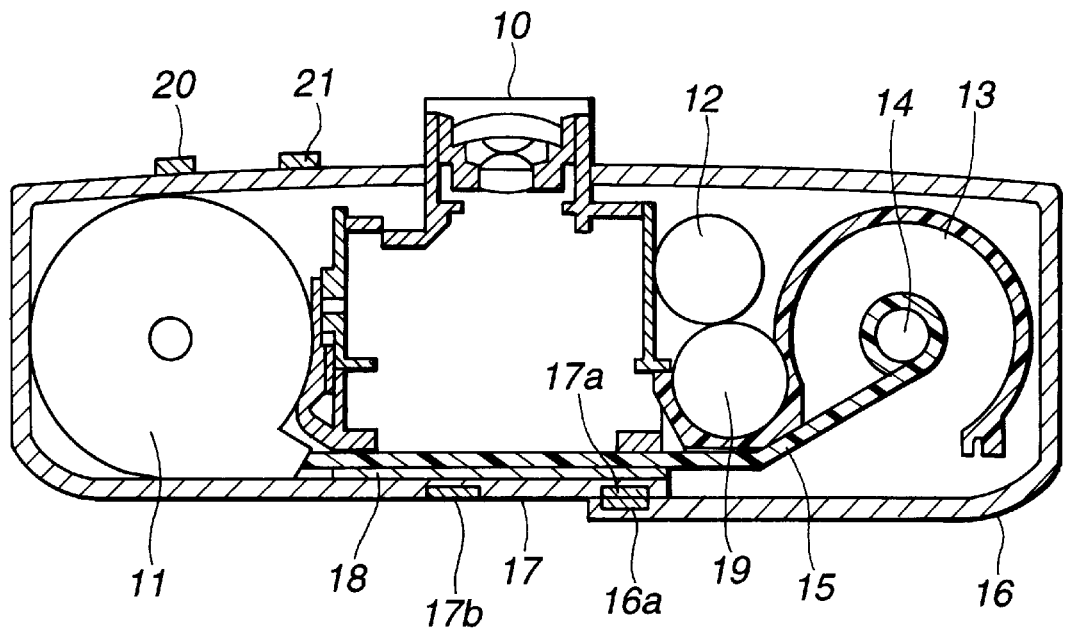
FIG. 6 is a sectional view showing the internal structure of the portable camera according to the second embodiment in a photographing mode state when viewed from the upper side.
Figure 7:
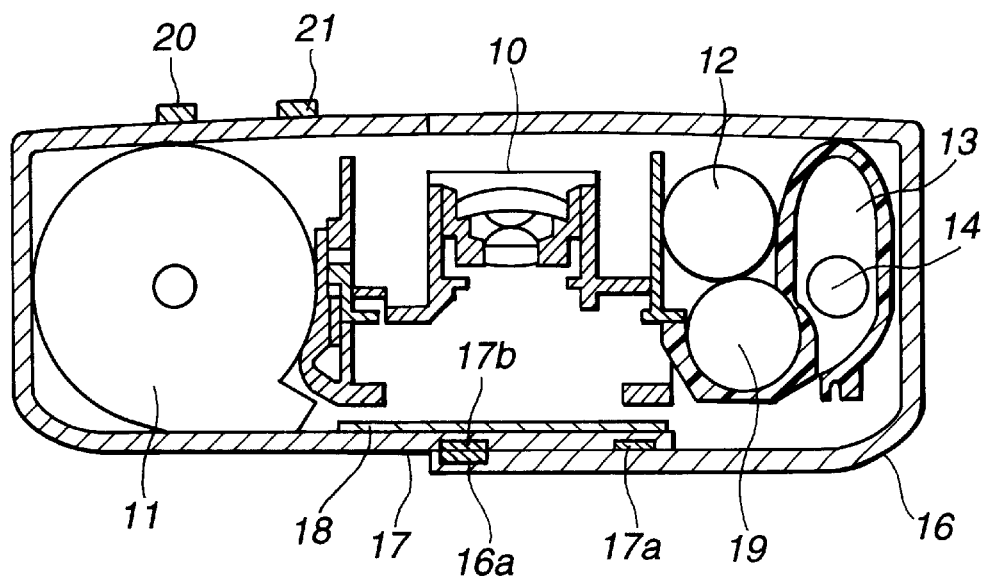
FIG. 7 is a sectional view showing the internal structure of the portable camera according to the second embodiment in a portable mode state when viewed from the upper side.

FIGS. 6 and 7 are sectional views showing the internal structure of the portable camera according to this embodiment when viewed from the upper side. FIG. 6 shows a photographing mode state, and FIG. 7 shows a portable mode state.

As shown in FIGS. 6 and 7, the body of the portable camera according to this embodiment comprises a first camera body 16 and a second camera body 17 which will be described below. The first camera body 16 incorporates a film take-up spool chamber 13, an electric flash main capacitor 12, a battery cell 19, and the like. The second camera body 17 incorporates a photographing lens unit set 10, a press plate 18, a loading chamber for a film cartridge 11, and the like.

The first camera body 16 can be extended/reduced with respect to the second camera body 17 in a film feeding direction.

The first camera body 16 has a contact point 16a formed thereon, and the second camera body 17 has contact points 17a and 17b formed thereon. In a photographing state, the contact point 16a is in contact with the contact point 17a to constitute a photographing state detection means 3 for detecting a photographing state. In a portable state, the contact point 16a is in contact with the contact point 17b to constitute a portable state detection means 4.

As shown in FIG. 2B, a spool 51 is driven by a belt 52 through a gear 55 by means of a motor 53. Referring to FIG. 2B, a solid line indicates a photographing state, and a dotted line indicates a portable state. Since the spool 51 moves to the film cartridge loading chamber in the portable state, the belt 52 becomes loose. In order to make the belt 52 tight, a pin 54 moves in a direction indicated by an arrow in FIG. 2B.

Figure 8A:
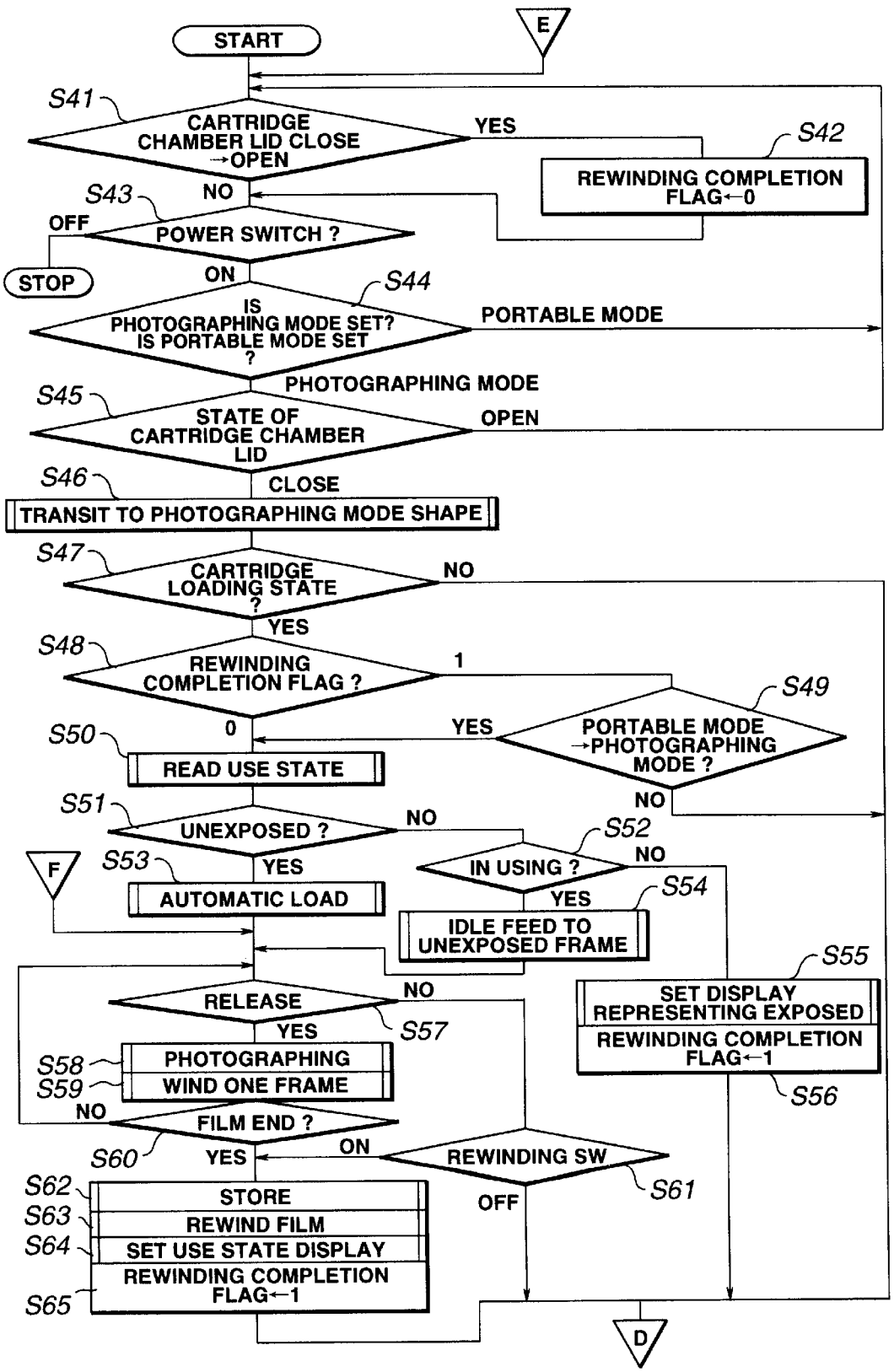
FIG. 8A is a flow chart showing main operations of the portable camera according to the second embodiment.
Figure 8B:
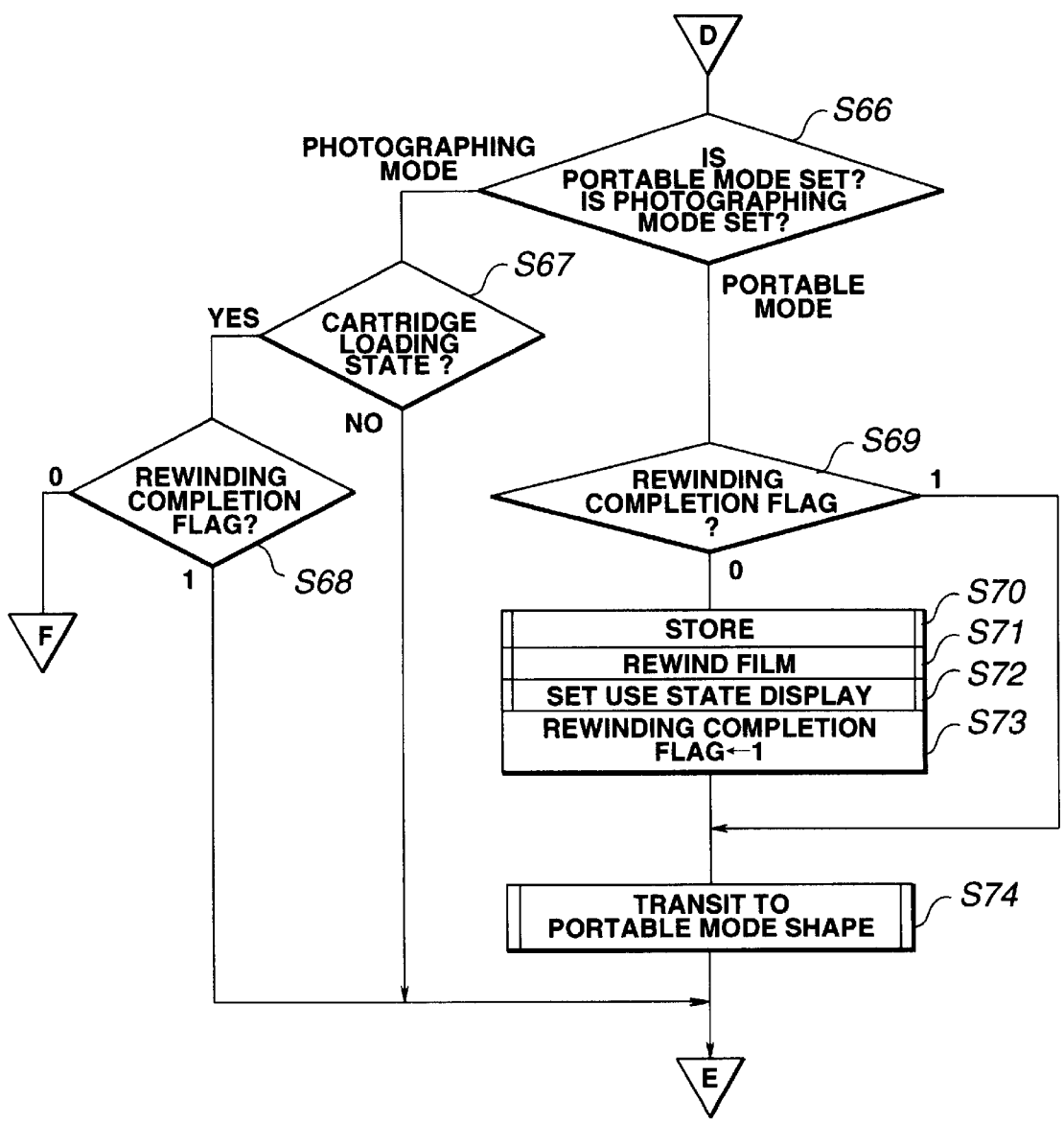
FIG. 8B is a flow chart showing main operations of the portable camera according to the second embodiment.

FIG. 8A and 8B are flow charts showing main operations of the portable camera according to the second embodiment. The operations of the camera will be described below with reference to the flow charts.

As shown in FIG. 8A, the CPU 1 checks whether the lid of a loading chamber for the film cartridge 11 (not shown) changes from a closed state to an open state (step S41). If the lid changes, a rewinding completion flag is cleared in step S42, and the flow shifts to step S43. On the other hand, if the lid does not change, the flow shifts to step S43.

The CPU checks in step S43 whether a power switch of the camera is ON or OFF (step S43). If the switch is OFF, a "STOP" mode is set. If the switch is ON, the flow shifts to step S44. If the CPU 1 determines the "STOP" mode is set, a program is designed such that the above operations are executed from START again when the switch such as the lid of the film cartridge chamber (not shown) changes.

In step S44, the CPU 1 detects whether the camera is set in a photographing mode or a portable mode. If the camera is set in the portable mode, the flow returns to step S41; otherwise, the flow shifts to step S45.

In step S45, the state of the lid of the loading chamber for the film cartridge 11 is checked. If the lid is open, the flow returns to step S41; otherwise, the flow shifts to step S46.

In step S46, transition of the shape of the camera to a photographing mode shape as shown in FIG. 6. As a transition means, a means for moving the first camera body 16 by the force of a motor or the like (not shown) is used.

In step S46, if the camera has had the photographing mode shape, the CPU 1 does not operate in step S46, and the flow shifts to next step S47.

The CPU 1 detects in step S47 whether the film cartridge 11 is loaded on the camera. If the film cartridge 11 is not loaded on the camera, the flow shifts to step S66 shown in FIG. 8B; otherwise, the CPU 1 checks whether the rewinding flag is set to "1" or "0" (step S48). If the rewinding flag is set to "0", the flow shifts to step S50. If the rewinding flag is set to "1", the flow shifts to step S49. The CPU 1 checks whether the portable mode changes into the photographing mode. If YES in step S49, the flow shifts to step S50; otherwise, the flow shifts to step S66 in FIG. 8B.

In step S50, the use state of the film in the film cartridge 11 is read (step S50).

Conventional various means for reading the use state of the film 15 in the film cartridge 11 are disclosed. Any one of the various means may be employed.

In steps S51 and S52, the CPU 1 checks on the basis of the use state read in step S50 whether the film 15 in the film cartridge 11 has been unexposed, is in use, or has been completely exposed throughout all the frames. More specifically, if the film 15 has been unexposed in step S51, the CPU 1 performs automatic loading to set the first frame at a photographing position (step S53).

If the film 15 is in use in step S52, the CPU 1 idly feeds the film to an unexposed frame to set the unexposed frame to a photographing position (step S54). If all the frames have been exposed, the CPU 1 sets a display representing an exposed state (step S55) and sets a rewinding flag (step S56), and the flow shifts to step S66 in FIG. 8B.

As a control method in step S54, various methods for reading magnetic data of photographing information recorded on each frame to determine a frame whose magnetic data cannot be detected as an unexposed frame are disclosed. Any one of these methods may be used.

The CPU 1 checks in step S57 whether a release switch (not shown) is pressed. If the release is pressed, the CPU 1 performs a photographing sub-routine (step S58) and then performs a sub-routine for winding one frame (step S59).

The moment the film is wound by one frame, photographing data such as date is magnetically recorded on the film. However, a large number of methods with respect to magnetic recording during one-frame winding are disclosed. Any one of the methods may be used.

Thereafter, the CPU 1 checks in step S60 whether the film is end (whether a photographing operation for the last frame is completed). If the film is not end, the flow returns to step S57; otherwise, data representing that all the frames have been exposed is stored in a non-volatile memory such as an EEPROM (not shown) (step S62). A film rewinding operation is performed in step S63.

If the release switch is not pressed in step S57, the flow shifts to step S61 to check whether a rewind switch (not shown) is pressed. If the rewind switch is pressed (ON), data representing that some frames of the film have been exposed is stored in a non-volatile memory such as an EEPROM (step S62), a film rewinding operation is performed in step S63. The CPU 1 sets a use state display of the film according to the use state of the film (step S64). A rewinding flag representing the rewinding operation is completed is set (step S65).

Thereafter, as shown in FIG. 8B, the CPU 1 checks whether the portable mode switch is ON or OFF (step S66). If the portable mode switch is OFF, the CPU 1 checks whether the film cartridge 11 is loaded (step S67). If the film cartridge 11 is not loaded (NO) in step S67, the flow returns to step S41. If the film cartridge 11 is loaded (YES), the CPU 1 checks whether the rewinding flag is set to "1" or "0" (step S68). If the rewinding flag is set to "1", the flow returns to step S41. If the rewinding flag is set to "0", the flow returns to step S57.

If the portable mode is set in step S66, the CPU 1 checks whether the rewinding operation is completed (step S69).

Here, when the film 15 is loaded, the flow shift to step S70 to store the use state of the film or the like in a non-volatile memory such as an EEPROM, and the film 15 is rewound into the film cartridge 11 (step S71). Thereafter, the CPU 1 sets a film use state display depending on the use state of the film (step S72), the rewinding completion flag is set to "1" (step S73), and the flow shifts to step S74.

On the other hand, if the film 15 is wound in the film cartridge 11 in step S69, i.e., if the rewinding flag is set to "1", the flow shifts to step S74.

In step S74, the lens barrel is collapse into the body as shown in FIG. 3A, and the lock state of the first camera body is released accordingly. The take-up spool chamber 13 is elastically deformed, and the first camera body 16 is slid to the film cartridge 11 (second camera body 17) side. The camera body is reduced in width direction, and the flow returns to step S41.

In the step S74, the first camera body 16 is slid by using a driving force of a motor or the like. If the portable mode shape has been set, any operation is not performed, and the flow shifts to the end.

In this manner, the portable camera according to this embodiment has the following characteristic features. That is, when the portable mode is selected, the film 15 is rewound into the film cartridge 11, and an empty space, i.e., the take-up spool chamber 13 is compressed to be reduced in size, thereby reducing the camera in size as a whole. In addition, when the photographing mode is selected, the take-up spool chamber 13 which is compressed is restored to a proper state, and the film is idly fed to an unexposed frame on the basis of the detection results of the film use state reading means 6 and the unexposed frame detection means 7 to make it possible to perform a photographing operation.

As described above, a camera which has a size at which a photographing operation is easily performed in a photographing state and has a small size to obtain good portability can be realized.

As described above, according to the second embodiment, a camera whose portability is improved without degrading functions and operability in the photographing state can be provided.

Figure 9:
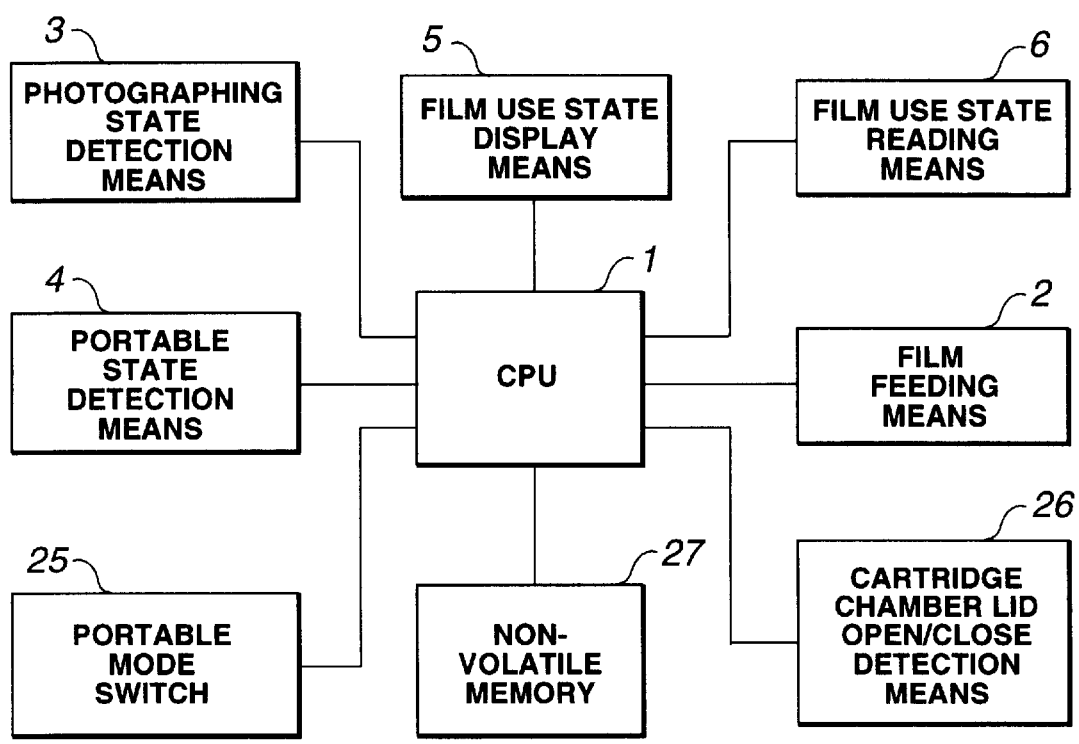
FIG. 9 is a schematic block diagram showing the arrangement of the portable camera according to the third embodiment of the present invention.

FIG. 9 is a schematic block diagram showing the arrangement of a portable camera according to the third embodiment of the present invention.

As shown in FIG. 9, the main components of the camera according to this embodiment are constituted by: a film feeding means 2 for winding/rewinding a film; a photographing state detection means 3 for detecting that a camera body is set in a photographing state in which photographing can be performed; a portable state detection means 4 for detecting that the camera body is set in a portable state in which the camera body is reduced in size; a portable mode SW 25 capable of performing a switching operation between a photographing mode and a portable mode to set one of these modes; a film use state display means 5 for displaying whether all the frames of the film loaded on the camera have been unexposed, some frames of the film have been exposed, or all the frames have been exposed; a film use state reading means 6 for reading the use state of the film; a non-volatile memory 27 such as an EEPROM; a cartridge chamber lid open/close detection means 26 for detecting a change of the cartridge chamber lid; and a CPU (Central Processing Unit) 1 for controlling the above means and controlling the camera as a whole.

Figure 10A:
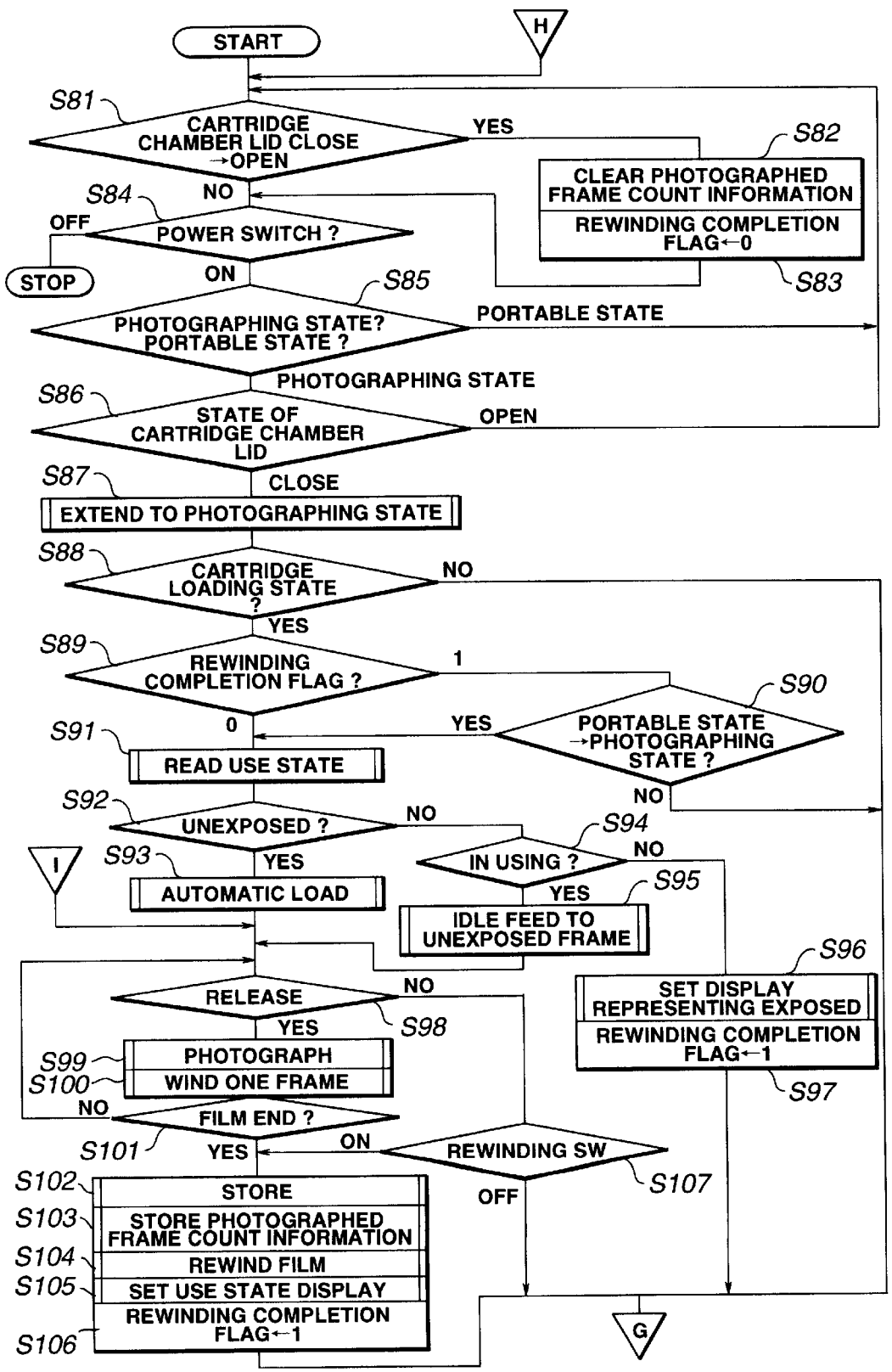
FIG. 10A is a flow chart showing main operations of a portable camera according to the third embodiment of the present invention.
Figure 10B:
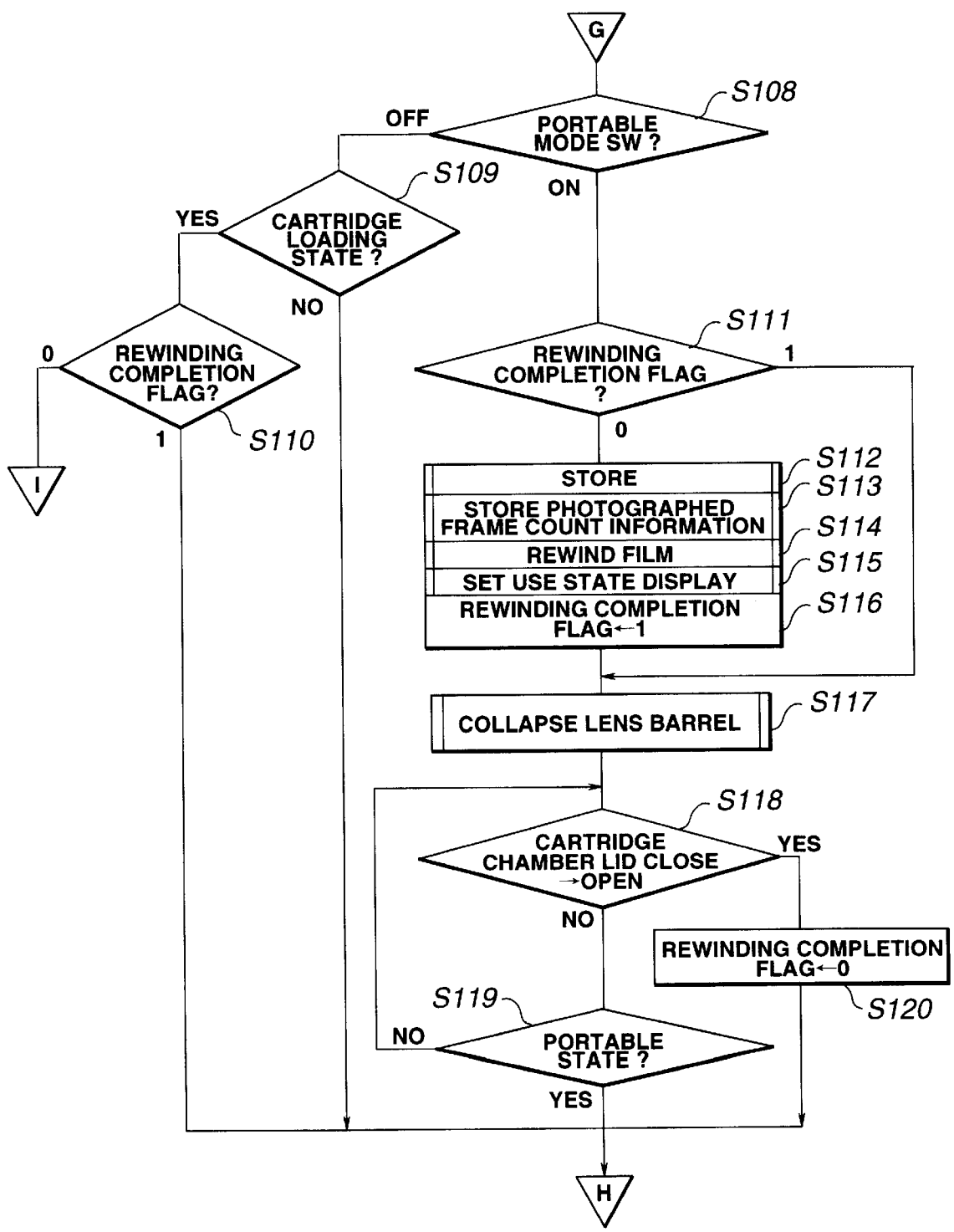
FIG. 10B is a flow chart showing main operations of a portable camera according to the third embodiment of the present invention.

FIGS. 10A and 10B are flow charts showing main operations of the portable camera according to the third embodiment. The operations of the camera will be described below with reference to the flow charts.

The CPU 1 checks whether the film cartridge chamber lid (not shown) changes from a closed state to an open state (step S81). If the lid changes (YES), photographing frame count information is cleared in step S82, a rewinding completion flag is cleared (step S83), and the flow shifts to step S84. If the lid does not change in step S81 (NO), the flow shifts to step S84. Since processes in step S84 to step S102 are the same as the processes in step S3 to step S20 of the flow chart in FIG. 4A described in the first embodiment, a description thereof will be omitted.

Information related to a photographed frame count is stored in a non-volatile memory such as an EEPROM in step S103. Since processes in step S104 to step S112 shown in FIG. 10B are the same as the processes in step S21 to step S29 of the flow chart in FIGS. 4A and 4B described in the first embodiment, a description thereof will be omitted.

In step S113 shown in FIG. 10B, as in step S103, information related to a photographed frame count is stored in a non-volatile memory such as an EEPROM. Since processes in step S114 to S120 are the same as the processes in step S30 to step S36, a description thereof will be omitted.

Figure 13:
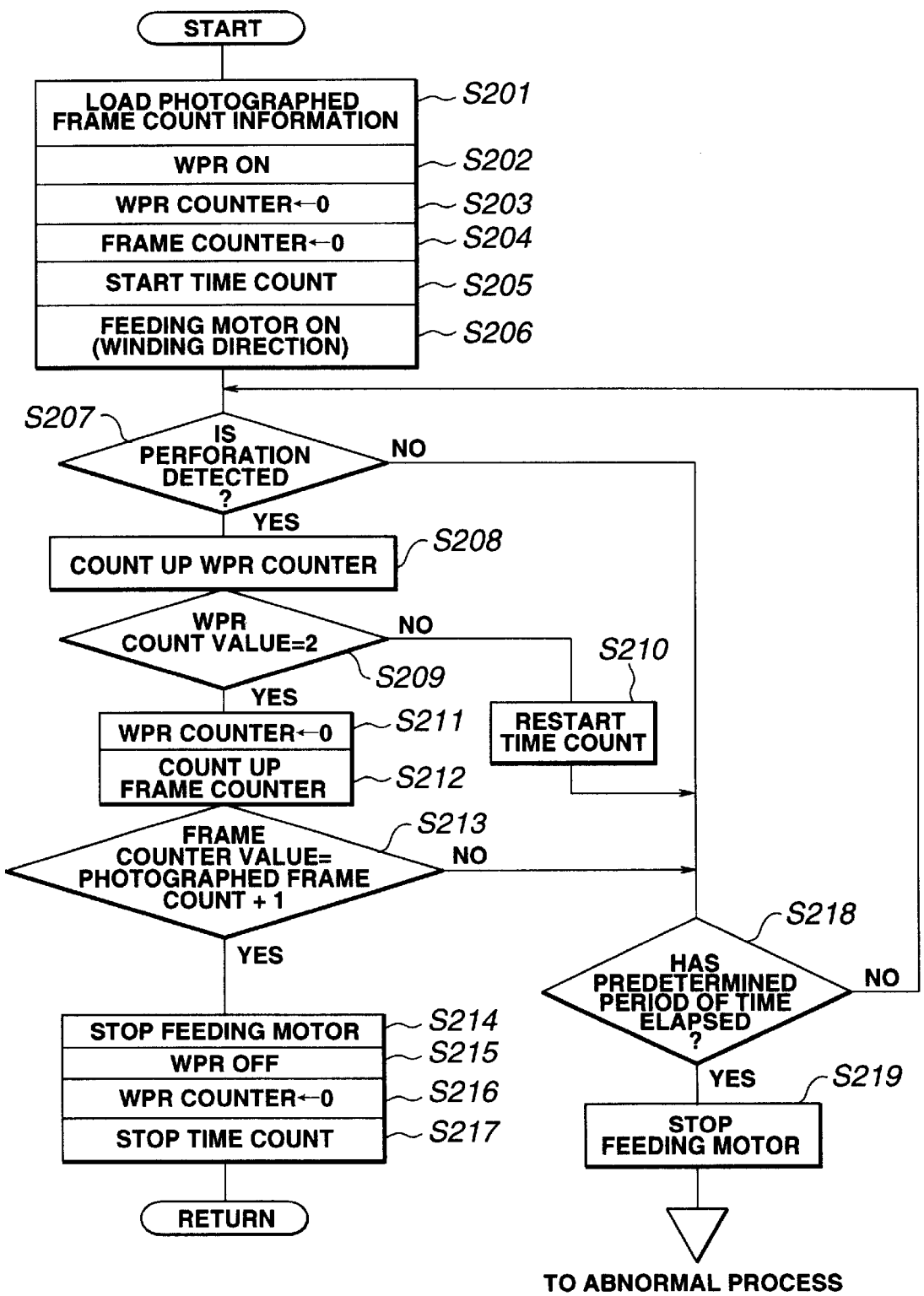
FIG. 13 is a flow chart showing a sub-routine for performing idle feeding to an exposed frame in the portable camera according to the third or fourth embodiment.

A flow chart which describes a sub-routine for feeding the film to an unexposed frame in step S95 is the flow chart shown in FIG. 13. The sub-routine will be described below with reference to FIG. 13. Photographed frame count information stored in the EEPROM or the like is loaded (step S201), a WPR (photo-reflector) for detecting perforations on the film is turned on (step S202), and a WPR serving as a perforation detection counter is cleared (step S203). A frame counter for counting wound frames is cleared (step S204), time count for determining abnormality is started (step S205), and the feeding motor is turned on (step S206) to start a film take-up operation.

The CPU. 1 checks in step S207 whether a perforation is detected. If NO in step S207, the flow shifts to step S218; otherwise, the WPR counter is counted up (step S208) to check whether he WPR counter value becomes 2, i.e., two perforations are detected (step S209). If NO in step 209, time count is restarted (step S210), the flow shifts to step S218. If YES in step S209, the WPR counter is cleared (step S211). The frame counter is counted up (step S212).

The CPU 1 checks whether the film is wound to (the photographed frame count loaded from the non-volatile memory such as an EEPROM) +1 (step S213). If NO in step S213, the flow shifts to step S218. If YES in step S213, the feeding motor is stopped in step S214, the WPR is turned off (step S215), the WPR counter is cleared (step S216), the time count is stopped (step S217), and the flow returns.

In step S218, the CPU 1 checks whether a predetermined period of time has elapsed after the time count is started. If the predetermined period of time has not elapsed (NO) in step S218, the flow returns to step S207. If the predetermined period of time has elapsed YES in step S218, the feeding motor is stopped (step S219) to perform an abnormal process. Since this abnormal process is not directly related to the present invention, a description thereof will be omitted.

As has been described above, in the portable camera according to the third embodiment has the following characteristic feature. That is, when the portable mode is selected, after photographed frame count information is stored in the non-volatile memory, the film is rewound, the take-up spool chamber 13 serving as an empty space is compressed to be reduced in size, thereby reducing the camera in size as a whole. In addition, the photographing mode is selected, the compressed take-up spool chamber 13 is restored to a proper state, the film is idly fed up to an unexposed frame on the basis of the film use state reading means and photographed frame count information stored in the non-volatile memory so as to make it possible to perform a photographing operation.

As described above, according to the third embodiment, a camera whose portability is improved without degrading functions or operability in a photographing operation can be provided.

Figure 11:
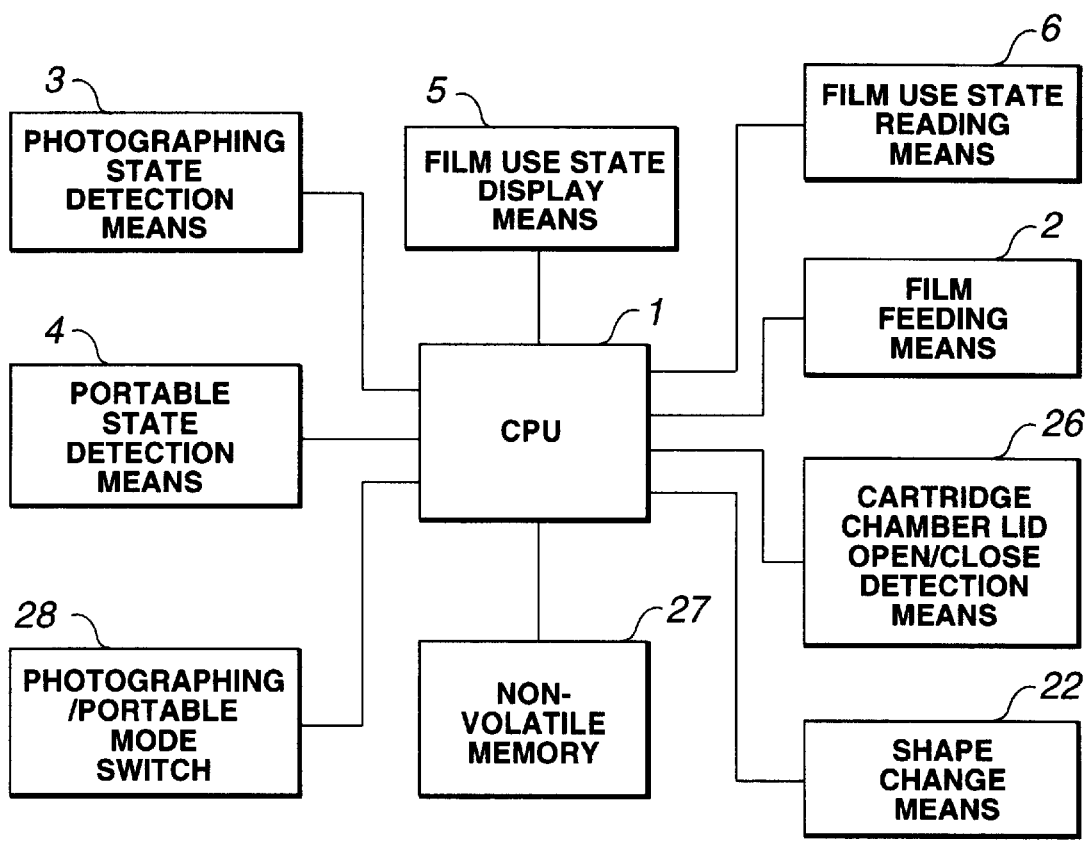
FIG. 11 is a schematic block diagram showing the arrangement of the portable camera according to the fourth embodiment of the present invention.

FIG. 11 is a schematic block diagram showing the arrangement of a portable camera according to the fourth embodiment of the present invention.

As shown in FIG. 11, the main components of the camera according to this embodiment are constituted by: a film feeding means 2 for winding/rewinding a film; a photographing state detection means 3 for detecting that a camera body is set in a photographing state in which photographing can be performed; a portable state detection means 4 for detecting that the camera body is set in a portable state in which the camera body is reduced in size; a portable mode switch SW 28 capable of performing a switching operation between a photographing mode and a portable mode to set one of these modes; a film use state display means 5 for displaying whether all the frames of the film loaded on the camera have been unexposed, some frames of the film have been exposed, or all the frames have been exposed; a film use state reading means 6 for reading the use state of the film; a non-volatile memory 27 such as an EEPROM; a cartridge chamber lid open/close detection means 26 for detecting a change of the cartridge chamber lid; a shape change means 22 changing the shape of the camera body to a shape in the photographing state in which photographing can be performed and a shape in the portable state in which the camera is reduced in size; and a CPU (Central Processing Unit) 1 for controlling the above means and controlling the camera as a whole.

Figure 12A:
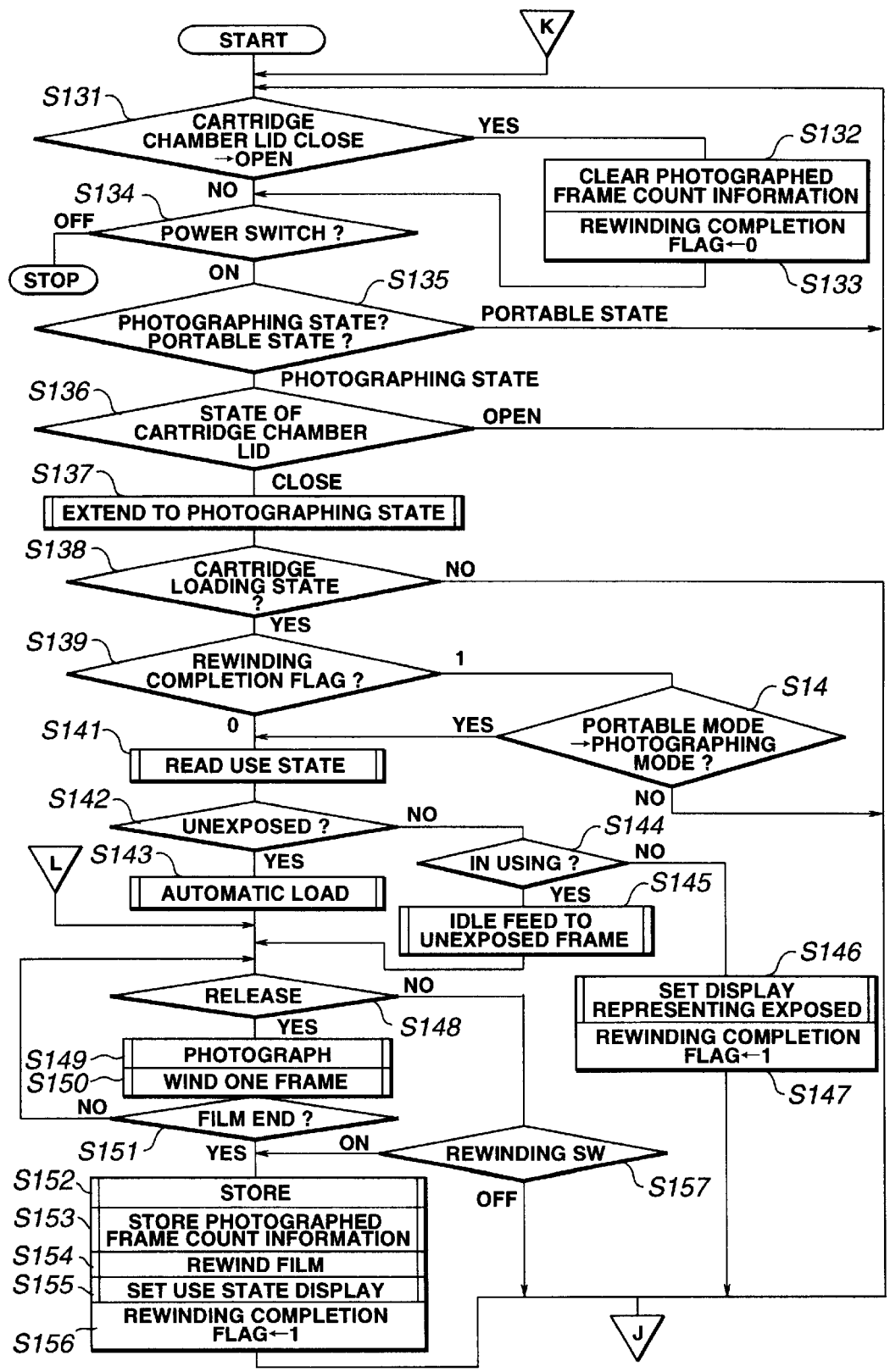
FIG. 12A is a flow chart showing main operations of a portable camera according to the fourth embodiment of the present invention.
Figure 12B:
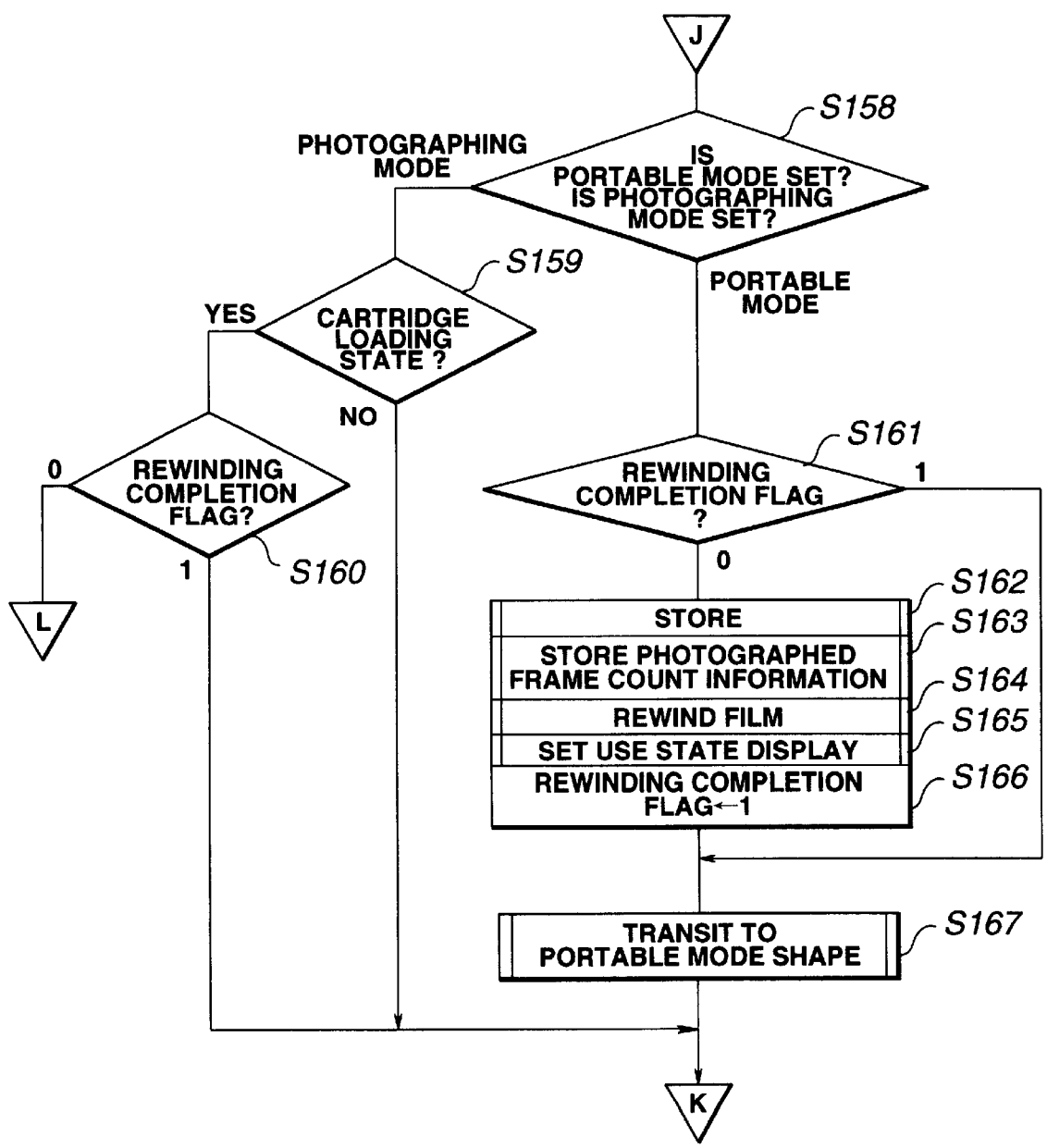
FIG. 12B is a flow chart showing main operations of a portable camera according to the fourth embodiment of the present invention.

FIGS. 12A and 12B are flow charts showing main operations of the portable camera according to the fourth embodiment. The operations of the camera will be described below with reference to the flow chart.

The CPU 1 checks whether the film cartridge chamber lid (not shown) changes from a closed state to an open state (step S131). If the lid changes (YES), photographing frame count information is cleared in step S132, a rewinding completion flag is cleared (step S133), and the flow shifts to step S134. If the lid does not change in step S131 (NO), the flow shifts to step S134. Since processes in step S134 to step S152 are the same as the processes in step S43 to step S62 of the flow chart in FIG. 8A described in the second embodiment, a description thereof will be omitted.

Information related to a photographed frame count is stored in a non-volatile memory such as an EEPROM in step S153. Since processes in step S154 to step S162 are the same as the processes in step S63 to step S70 of the flow chart in FIGS. 8A and 8B described in the first embodiment, a description thereof will be omitted.

In step S163, as in step S153, information related to a photographed frame count is stored in a non-volatile memory such as an EEPROM. Since processes in step S164 to S167 are the same as the processes in step S71 to step S74, a description thereof will be omitted.

A flow chart which describes a sub-routine for feeding the film to an unexposed frame in step S145 is the flow chart shown in FIG. 13. The sub-routine will be described below with reference to FIG. 13. Photographed frame count information stored in the EEPROM or the like is loaded (step S201), a WPR (photo-reflector) for detecting perforations on the film is turned on (step S202), and a WPR serving as a perforation detection counter is cleared (step S203). A frame counter for counting wound frames is cleared (step S204), time count for determining abnormality is started (step S205), and the feeding motor is turned on (step S206) to start a film take-up operation.

The CPU 1 checks in step S207 whether a perforation is detected. If NO in step S207, the flow shifts to step S218; otherwise, the WPR counter is counted up (step S208) to check whether he WPR counter value becomes 2, i.e., two perforations are detected (step S209). If NO in step 209, time count is restarted (step S210), the flow shifts to step S218. If YES in step S209, the WPR counter is cleared (step S211). The frame counter is counted up (step S212).

The CPU 1 checks whether the film is wound to (the photographed frame count loaded from the non-volatile memory such as an EEPROM) +1 (step S213). If NO in step S213, the flow shifts to step S218. If YES in step S213, the feeding motor is stopped in step S214, the WPR is turned off (step S215), the WPR counter is cleared (step S216), the time count is stopped (step S217), and the flow returns. In step S218, the CPU 1 checks whether a predetermined period of time has elapsed after the time count is started. If the predetermined period of time has not elapsed (NO) in step S218, the flow returns to step S207. If the predetermined period of time has elapsed YES in step S218, the feeding motor is stopped (step S219) to perform an abnormal process. Since this abnormal process is not directly related to the present invention, a description thereof will be omitted.

As has been described above, in the portable camera according to the fourth embodiment has the following characteristic feature. That is, when the portable mode is selected, after photographed frame count information is stored in the non-volatile memory, the film is rewound, the take-up spool chamber 13 serving as an empty space is compressed to be reduced in size, thereby reducing the camera in size as a whole.

In addition, the portable camera according to the fourth embodiment has the following characteristic feature. The photographing mode is selected, the compressed take-up spool chamber 13 is restored to a proper state, the film is idly fed up to an unexposed frame on the basis of the film use state reading means and photographed frame count information stored in the non-volatile memory to make it possible to perform a photographing operation.

As described above, according to the third embodiment, a camera whose portability is improved without degrading functions or operability in a photographing operation can be provided.

In this invention, it is apparent that working modes different in a wide range can be formed on this basis of this invention without departing from the spirit and scope of the invention. This invention is not restricted by any specific embodiment expect being limited by the appended claims.

What is claimed is:

1. A camera having a cartridge chamber for accommodating a film cartridge, a take-up chamber, having a take-up shaft for taking up a film accommodated in said film cartridge, for accommodating the taken-up film, and a film feeding path, located between said cartridge chamber and said take-up chamber, on which the film is conveyed, comprising:

a film feeding device for selectively performing a take-up drive for feeding a film from said film cartridge to take up the film on a take-up shaft and a rewinding drive for entirely rewinding the film into said film cartridge to accommodate the film in said film cartridge;

a camera body whose shape can be dislocated to a photographing position at which photographing can be performed and a portable position at which said camera is smaller than that at the photographing position;

a mode detector, which can selectively set a photographing mode as a photographing state in which photographing can be performed and a portable mode as a portable state in which said camera is smaller than that in the photographing state, for generating a signal output according to the set mode;

a camera body dislocation detector for generating a photographing position signal by dislocation of said camera body from the portable position to the photographing position after said camera body is proximate to the photographing position, and generating a portable position signal by dislocation of said camera body from the photographing position to said portable position after said camera body is proximate to the portable position;

camera body drive means for electrically driving said camera body between the photographing position and the portable position;

film feeding drive control means for controlling a take-up drive or a winding drive of said film feeding device depending on the signals of said mode detector and said camera body dislocation detector; and a rewinding end detector for detecting the end of film movement by the rewinding drive of said film feeding device to generate an end signal, wherein said camera body drive means performs a dislocation drive from the portable position to the photographing position when the photographing mode is set by said mode detector, said film feeding device causes said film feeding drive control means to start the take-up drive when said film feeding device receives the photographing position signal from said camera body detector, said film feeding device causes said film feeding drive control means to start the rewinding drive responsive to the portable mode being set by said mode detector, thereafter, said film feeding means stops the rewinding drive when the rewinding end detector detects the end signal, and, according to the above operations, said camera body drive means drives said camera body to dislocate said camera body from the photographing position to the portable position.

2. A camera according to claim 1, comprising:
   film unexposed frame detection means for detecting an unexposed frame position on the film, and
   wherein, when the photographing mode is detected, said film feeding device idly feeds the film such that the film is taken up from said film cartridge into said take-up chamber for photographing preparation depending on a detection result obtained by said film unexposed frame detection means.

3. A camera according to claim 1, wherein, when said camera body is dislocated to the photographing position at which photographing can be performed and the portable position at which said camera body is smaller than that at the photographing position to change the shape of said camera body, said take-up chamber is formed such that said take-up chamber can be extended/reduced substantially along the film feeding direction of said film feeding path.

4. A camera according to claim 3, wherein said take-up chamber comprises at least one of an elastic material and a flexible material.

5. A camera according to claim 1 in which portions of the camera body are displaceable relative to one another substantially in a direction of film travel when the camera changes between the photographing state and the portable state.

6. A camera according to claim 1, wherein two portions of the camera body, each containing one of the cartridge chamber and the take-up chamber, are moveable relative to one another to effect deformation of the camera body.

7. A camera according to claim 1, wherein the film feeding drive control means is for controlling the film feeding device so that film is not accommodated in the take-up chamber when the camera is in the portable position state.

8. A camera according to claim 1 in which a portion of the camera body containing the cartridge chamber and a portion of the camera body containing the take-up chamber are displaceable relative to one another substantially in a direction of film travel when the camera changes between the photographing position state and the portable position state so that relative positions of the cartridge chamber and the take-up chamber can be changed.

9. A camera on which a film cartridge is loaded to be used, comprising:
   film feeding means for selectively performing a take-up drive for feeding a film from said film cartridge to take up the film on a take-up shaft and a rewinding drive for rewinding the film wound on said take-up shaft into said film cartridge to accommodate the film in said film cartridge;
   a camera body which is capable of dislocating the shape of said camera to a photographing position state in which photographing can be performed and a portable position state in which said camera is reduced in size; and
   control means for winding the film on said take-up shaft by the take-up drive of said film feeding means which the photographing position state is set, and controlling the film such that the film is entirely accommodated in said film cartridge by the rewinding drive of said film feeding means responsive to the portable position state being set,
   in which a portion of the camera body containing the film cartridge and a portion of the camera body containing the take-up shaft are displaceable relative to one another substantially in a direction of film travel when the camera changes between the photographing position state and the portable position state so that relative positions of the film cartridge and the take-up shaft can be changed.

10. A camera having a cartridge chamber for accommodating a film cartridge, a take-up chamber, having a take-up shaft for taking up a film accommodated in said film cartridge, for accommodating the taken-up film, and a film feeding path, located between said cartridge chamber and said take-up chamber, on which the film is conveyed, comprising:

a film feeding device for selectively performing a take-up drive for feeding a film from said film cartridge to take up the film on a take-up shaft and a rewinding drive for rewinding the film wound on said take-up shaft into said film cartridge to accommodate the film in said film cartridge;

a shape dislocation mechanism for dislocating the shape of said camera to a photographing state in which photographing can be performed and a portable state in which said camera is reduced in size;

a photographing position detection switch for detecting that the shape is dislocated from the portable state to the photographing state; and a portable mode switch for setting a portable mode for starting preparation to set the portable state, wherein the film is rewound from said take-up chamber into said film cartridge to be accommodated in said film cartridge by said film feeding device responsive to the portable mode being set by said portable mode switch, a dislocating operation of the shape of said camera from the photographing state to the portable state is allowed by said shape chance mechanism, and the film is taken up from said film cartridge into said take-up chamber by said film feeding device when the photographing state is detected by said photographing position detection switch, in which portions of the camera are displaceable relative to one another substantially in a direction of film travel when the camera changes between the photographing state and the portable state.

11. A camera on which a film cartridge is loaded to be used, comprising:

film feeding means for selectively performing a take-up drive for feeding a film from said film cartridge to take up the film on a take-up shaft and a rewinding drive for rewinding the film wound on said take-up shaft into said film cartridge to accommodate the film in said film cartridge;

a camera body which is capable of dislocating the shape of said camera to a photographing position state in which photographing can be performed and a portable position state in which said camera is reduced in size; and control means for winding the film on said take-up shaft by the take-up drive of said film feeding means which the photographing position state is set, and controlling the film such that the film is entirely accommodated in said film cartridge by the rewinding drive of said film feeding means responsive to the portable position state being set, wherein two portions of the camera body, each containing one of the cartridge and take-up shaft, are moveable relative to one another to effect deformation of the camera body.

12. A camera having a cartridge chamber for accommodating a film cartridge, a take-up chamber, having a take-up shaft for taking up a film accommodated in said film cartridge, for accommodating the taken-up film, and a film feeding path, located between said cartridge chamber and said take-up chamber, on which the film is conveyed, comprising:

a film feeding device for selectively performing a take-up drive for feeding a film from said film cartridge to take up the film on a take-up shaft and a rewinding drive for rewinding the film wound on said take-up shaft into said film cartridge to accommodate the film in said film cartridge;

a shape dislocation mechanism for dislocating the shape of said camera to a photographing state in which photographing can be performed and a portable state in which said camera is reduced in size;

a photographing position detection switch for detecting that the shape is dislocated from the portable state to the photographing state; and a portable mode switch for setting a portable mode for starting preparation to set the portable state, wherein the film is rewound from said take-up chamber into said film cartridge to be accommodated in said film cartridge by said film feeding device responsive to the portable mode being set by said portable mode switch, a dislocating operation of the shape of said camera from the photographing state to the portable state is allowed by said shape change mechanism, and the film is taken up from said film cartridge into said take-up chamber by said film feeding device when the photographing state is detected by said photographing position detection switch, wherein two portions of the camera, each containing one of the cartridge chamber and the take-up chamber, are moveable relative to one another to effect deformation of the camera.

13. A camera on which a film cartridge is loaded to be used, comprising:

a film feeding device for selectively performing a take-up drive for feeding a film from said film cartridge to take up the film on a take-up shaft and a rewinding drive for rewinding the film wound on said take-up shaft into said film cartridge to accommodate the film in said film cartridge; and a camera body which is capable of dislocating the shape of said camera to a photographing position state in which photographing can be performed and a portable position state in which said camera is reduced in size;

wherein film feeding device winds the film wound on said take-up shaft by the take-up drive of said film feeding device when the photographing position state is set, and controls the film such that the film is entirely accommodated in said film cartridge by the rewinding drive of said film feeding device responsive to the portable position state being set, in which a portion of the camera body containing the film cartridge and a portion of the camera body containing the take-up shaft are displaceable relative to one another substantially in a direction of film travel when the camera changes between the photographing position state and the portable position state so that relative positions of the film cartridge and the take-up shaft can be changed.

14. A camera having a cartridge chamber for accommodating a film cartridge, a take-up chamber, having a take-up shaft for taking up a film accommodated in said film cartridge, for accommodating the taken-up film, and a film feeding path, located between said cartridge chamber and said take-up chamber, on which the film is conveyed, comprising:

a film feeding device for selectively performing a take-up drive for feeding a film from said film cartridge to take up the film on a take-up shaft and a rewinding drive for rewinding the film wound on said take-up shaft into said film cartridge to accommodate the film in said film cartridge; and a camera body which is capable of dislocating the shape of said camera to a photographing position state in which photographing can be performed and a portable position state in which said camera is reduced in size; and portable mode setting means for setting said camera body from the photographing state to a portable state in which said camera body is reduced in size, wherein responsive to the portable mode being set, said film feeding device is controlled to rewind the film from said take-up chamber into said film cartridge to accommodate the film in said film cartridge, and, thereafter, the shape of said camera can be changed from the photographing state to the portable state, in which portions of the camera body are displaceable relative to one another substantially in a direction of film travel when the camera changes between the photographing state and the portable state.

15. A camera having a cartridge chamber for accommodating a film cartridge, a take-up chamber, having a take-up shaft for taking up a film accommodated in said film cartridge, for accommodating the taken-up film, and a film feeding path, located between said cartridge chamber and said take-up chamber, on which the film is conveyed, comprising:

a film feeding device for selectively performing a take-up drive for feeding a film from said film cartridge to take up the film on a take-up shaft and a rewinding drive for rewinding the film wound on said take-up shaft into said film cartridge to accommodate the film in said film cartridge; and a camera body which is capable of dislocating the shape of said camera to a photographing position state in which photographing can be performed and a portable position state in which said camera is reduced in size; and portable mode setting means for setting said camera body from the photographing state to a portable state in which said camera body is reduced in size, wherein responsive to the portable mode being set, said film feeding device is controlled to rewind the film from said take-up chamber into said film cartridge to accommodate the film in said film cartridge, and, thereafter, the shape of said camera can be changed from the photographing state to the portable state, wherein two portions of the camera body, each containing one of the cartridge and take-up shaft, are moveable relative to one another to effect deformation of the camera body.

16. A camera having a cartridge chamber for accommodating a film cartridge, a take-up chamber, having a take-up shaft for taking up a film accommodated in said film cartridge, for accommodating the taken-up film, and a film feeding path, located between said cartridge chamber and said take-up chamber, on which the film is conveyed, comprising:

a film feeding device for selectively performing a take-up drive for feeding a film from said film cartridge to take up the film on a take-up shaft and a rewinding drive for rewinding the film wound on said take-up shaft into said film cartridge to accommodate the film in said film cartridge; and a camera body which is capable of dislocating the shape of said camera to a photographing position state in which photographing can be performed and a portable position state in which said camera is reduced in size; and portable mode setting means for setting said camera body from the photographing state to a portable state in which said camera body is reduced in size, wherein responsive to the portable mode being set, said film feeding device is controlled to rewind the film from said take-up chamber into said film cartridge to accommodate the film in said film cartridge, and, thereafter, the shape of said camera can be changed from the photographing state to the portable state, wherein two portions of the camera body, each containing one of the cartridge chamber and the take-up chamber, are moveable relative to one another to effect deformation of the camera body.

17. A camera having a cartridge chamber for accommodating a film cartridge, a take-up chamber, having a take-up shaft for taking up a film accommodated in said film cartridge, for accommodating the taken-up film, and a film feeding path, located between said cartridge chamber and said take-up chamber, on which the film is conveyed, comprising:

a film feeding device for selectively performing a take-up drive for feeding a film from said film cartridge to take up the film on a take-up shaft and a rewinding drive for rewinding the film wound on said take-up shaft into said film cartridge to accommodate the film in said film cartridge; and a camera body which is dislocated to a photographing position state in which photographing can be performed and a portable position state in which said camera is reduced in size to change the shape of said camera body;

a camera body dislocation detector for generating signal after said camera body is proximate to the photographing position by dislocation from the portable position to the photographing position, and stopping generation of the signal by dislocation of said camera body from the photographing position to the portable position;

a rewinding signal generator for generating a start signal for starting the rewinding drive of said film feeding device responsive to termination of the signal from the camera body dislocation detector; and a rewinding end detector for detecting the end of film movement by the rewinding drive of said film feeding device to generate an end signal;

wherein the take-up drive by said film feeding device is started when said film feeding device receives a photographing position signal, which represents that said camera body reaches from the portable position to photographing position, from said camera body dislocation detector, the rewinding drive by said film feeding device is started when said film feeding device receives the start signal from said rewinding signal generator, and the rewinding drive is stopped when said rewinding end detector detects the end signal, thereby making it possible to dislocate said camera body from the photographing position to the portable position, wherein two portions of the camera body, each containing one of the cartridge chamber and the take-up chamber, are moveable relative to one another to effect deformation of the camera body.

* * * * *